(12) United States Patent
Matsumoto et al.

(10) Patent No.: US 10,018,801 B2
(45) Date of Patent: Jul. 10, 2018

(54) LENS BARREL AND IMAGING DEVICE

(71) Applicant: Konica Minolta, Inc., Tokyo (JP)

(72) Inventors: Tomohiro Matsumoto, Osaka (JP); Yoshifumi Mitani, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 34 days.

(21) Appl. No.: 14/773,082

(22) PCT Filed: Dec. 2, 2013

(86) PCT No.: PCT/JP2013/007054
§ 371 (c)(1),
(2) Date: Sep. 4, 2015

(87) PCT Pub. No.: WO2014/136162
PCT Pub. Date: Sep. 12, 2014

(65) Prior Publication Data
US 2016/0018621 A1    Jan. 21, 2016

(30) Foreign Application Priority Data

Mar. 6, 2013   (JP) .................................. 2013-043631

(51) Int. Cl.
*G02B 7/02* (2006.01)
*G02B 7/10* (2006.01)
(52) U.S. Cl.
CPC .............. *G02B 7/10* (2013.01); *G02B 7/102* (2013.01)
(58) Field of Classification Search
CPC .................... G02B 7/10; G02B 7/102
See application file for complete search history.

(56) References Cited

U.S. PATENT DOCUMENTS

| 7,113,350 B2 | 9/2006 | Yasuda |
| 7,929,228 B2 | 4/2011 | Oikawa |
| 2006/0007565 A1* | 1/2006 | Eto .................. G02B 7/102 359/819 |

FOREIGN PATENT DOCUMENTS

| JP | H11-109209 A | 4/1999 |
| JP | 2004-054027 A | 2/2004 |
| JP | 2006-178304 A | 7/2006 |
| JP | 2010-191061 A | 9/2010 |
| JP | 2011-064996 A | 3/2011 |

OTHER PUBLICATIONS

Office Action issued in corresponding Japanese Application No. 2015-504010 dated Aug. 30, 2016, and English translation thereof (8 pages).

(Continued)

*Primary Examiner* — Alicia M Harrington
(74) *Attorney, Agent, or Firm* — Osha Liang LLP

(57) ABSTRACT

A lens barrel and an imaging device utilizing the same includes a fixed cylinder that has a guide groove; a cam cylinder which is rotatably provided to the fixed cylinder and has a cam groove having a tapered section; and a moving lens support member that supports a moving lens and movably supports a cam follower that moves along the guide groove. The cam follower has a tapered contact section, which can be brought into contact with the tapered section of the cam groove, and is impelled radially outward by the cam follower impelling member.

8 Claims, 14 Drawing Sheets

(56) References Cited

OTHER PUBLICATIONS

English translation of International Preliminary Report on Patentability issued in corresponding International Application No. PCT/JP2013/007054 dated Sep. 8, 2015(6 pages).
International Search Report issued in PCT/JP2013/007054 dated Mar. 4, 2014 (1 page).

* cited by examiner

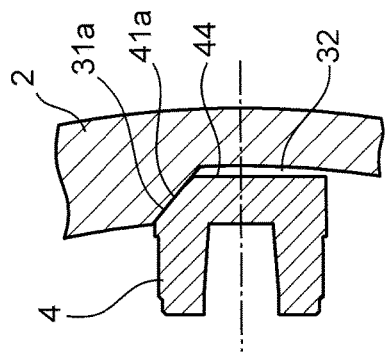
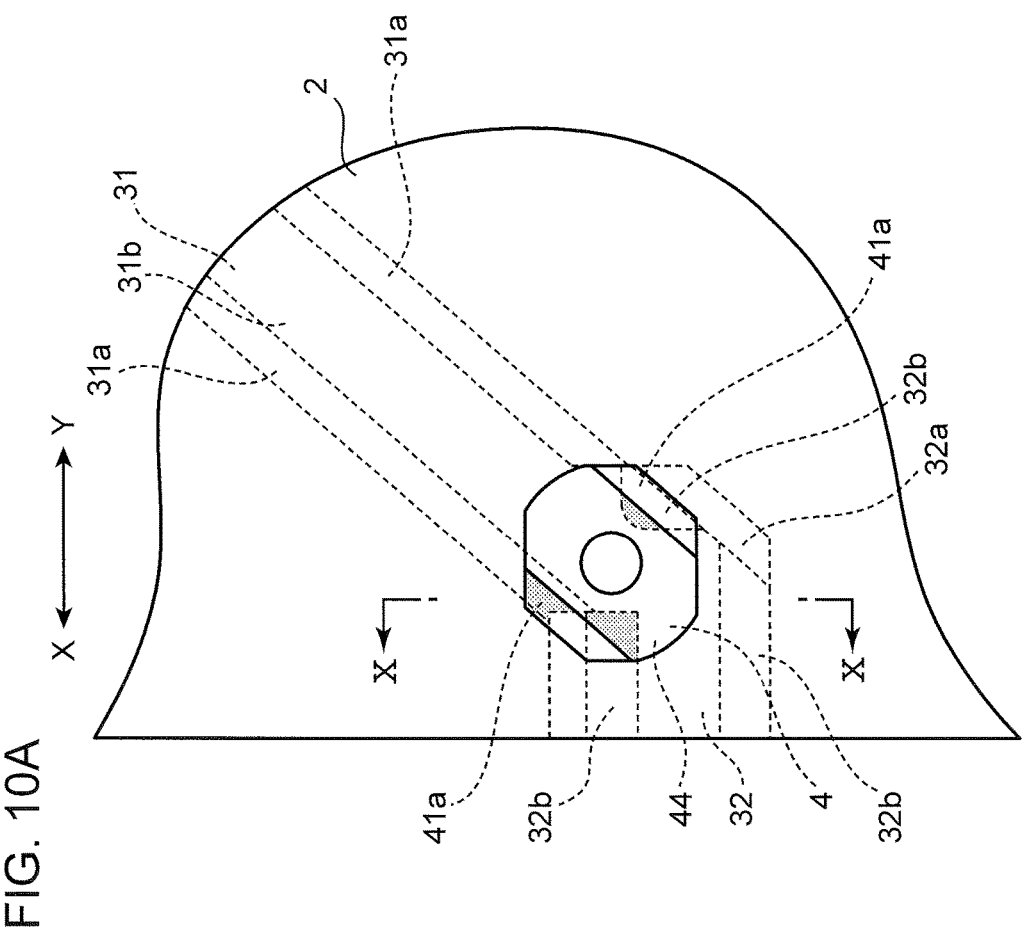

LENS BARREL AND IMAGING DEVICE

TECHNICAL FIELD

The present invention relates to a lens barrel and an imaging device using the lens barrel.

BACKGROUND ART

A conventionally known lens barrel includes a fixed cylinder having a guide groove extending along an optical axis direction, a cam cylinder rotatably disposed with respect to the fixed cylinder and having a cam groove, a cam follower configured to slide on the cam groove and move along the guide groove of the fixed cylinder, and a lens holding member supporting the cam follower and configured to move in the optical axis direction together with the cam follower.

As such a lens barrel having the above-described configuration, Patent Document 1, for example, discloses a lens barrel in which a cam follower is biased radially outward by a cam follower biasing member so that a cam groove contact portion constituted by a frustoconical circumferential surface at a radially outside tip of the cam follower is pressed against an inner surface of the cam groove.

Patent Document 2, for example, discloses an image taking device including a lens barrel having three impact-resistance cam grooves in addition to three driving cam grooves. The impact-resistance cam grooves form a predetermined clearance with respect to cam followers in a normal operation so as to prevent deformation of the driving cam grooves or the cam followers or displacement of the cam followers from the cam grooves when an impact is applied to the lens barrel.

However, since the cam groove contact portion of the cam follower is constituted by the frustoconical circumferential surface in Patent Document 1, the cam groove contact portion of the cam follower is in line contact with the cam groove, and thus, the contact area between the cam groove contact portion and the cam groove is small. Accordingly, when an impact is applied to the lens barrel, the cam follower is displaced from the cam groove, resulting in deformation of the cam follower and/or the cam groove.

On the other hand, in the lens barrel disclosed in Patent Document 2, even when an impact is applied to the lens barrel, the cam followers are less likely to be displaced from the cam grooves and the cam followers and/or the cam grooves are less likely to be deformed because of the three impact-resistance cam grooves and the cam followers fitted in the cam grooves. In the lens barrel disclosed in Patent Document 2, however, the three impact-resistance cam grooves are formed in addition to the three driving cam grooves. Accordingly, a larger space is necessary to form cam grooves comparing to the configuration of only the driving cam grooves, leading to an increase in the size of the unit. In addition, the impact-resistance cam grooves and the impact-resistance cam followers need to be accurately formed in order to prevent deformation of the can grooves and the cam followers. This requires considerable time and cost for fabrication.

CITATION LIST

Patent Documents

Patent Document 1: Japanese Unexamined Patent Application Publication No. 11-109209

Patent Document 2: Japanese Unexamined Patent Application Publication No. 2011-64996

SUMMARY OF THE INVENTION

One aspect of the present invention comprises a lens barrel and an imaging device in which a cam follower is less likely to be displaced from a cam groove or the cam follower and/or the cam groove is less likely to be deformed even upon application of an impact, and which can be easily produced at low costs.

A lens barrel and an imaging device using the lens barrel according to one or more embodiments of the present invention include: a fixed cylinder having a guide hollow; a cam cylinder rotatably disposed on the fixed cylinder and including a cam groove having a tapered portion; and a moving lens holding member for holding a moving lens, and movably holding a cam follower that moves along the guide hollow. The cam follower has a tapered contact portion that is operable to come into surface contact with the tapered portion of the cam groove. The cam follower is biased radially outward by a cam follower biasing member.

Advantages according to one or embodiments will become apparent from the following detailed description and attached drawings.

BRIEF DESCRIPTION OF THE DRAWINGS

FIGS. 10A and 10B show views for describing a state in which the cam follower has entered a cam groove from the cam follower introducing groove in accordance with one or more embodiments.

DETAILED DESCRIPTION OF EMBODIMENTS

Figure 1:
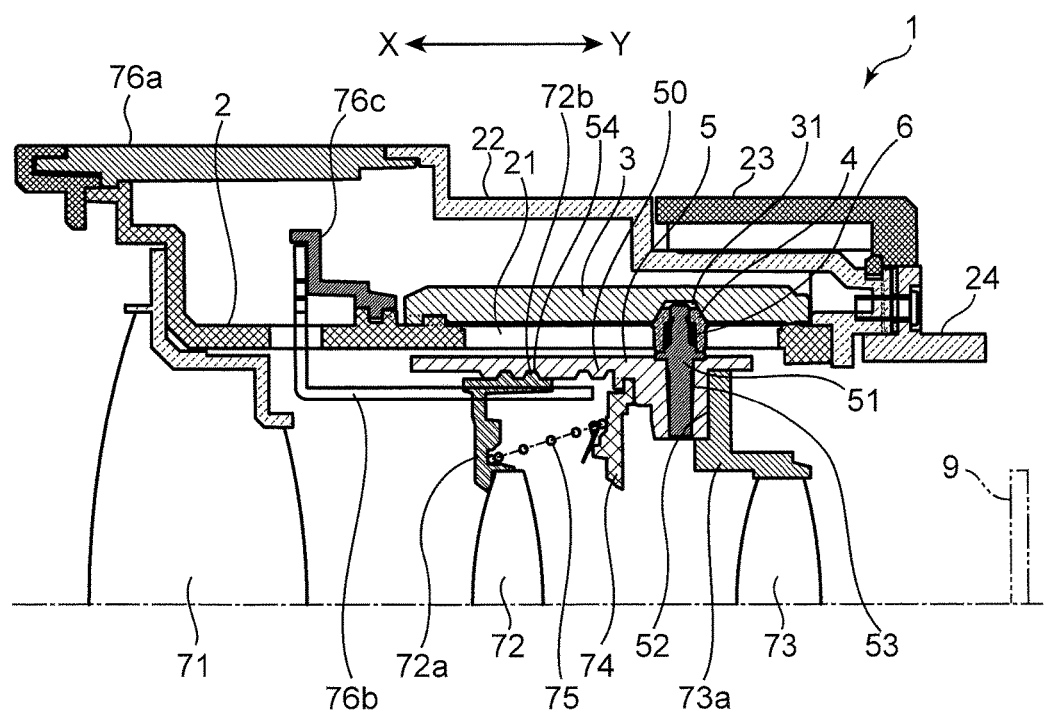
FIG. 1 is a half-sectional view of a lens barrel according to a first embodiment.

Embodiments of the present invention will be described with reference to the drawings. The same components are designated by the same reference numerals, and description thereof is not repeated when unnecessary. Numerals without suffixes herein collectively identify corresponding parts, and numerals with suffixes individually identify corresponding components.

Figure 2:
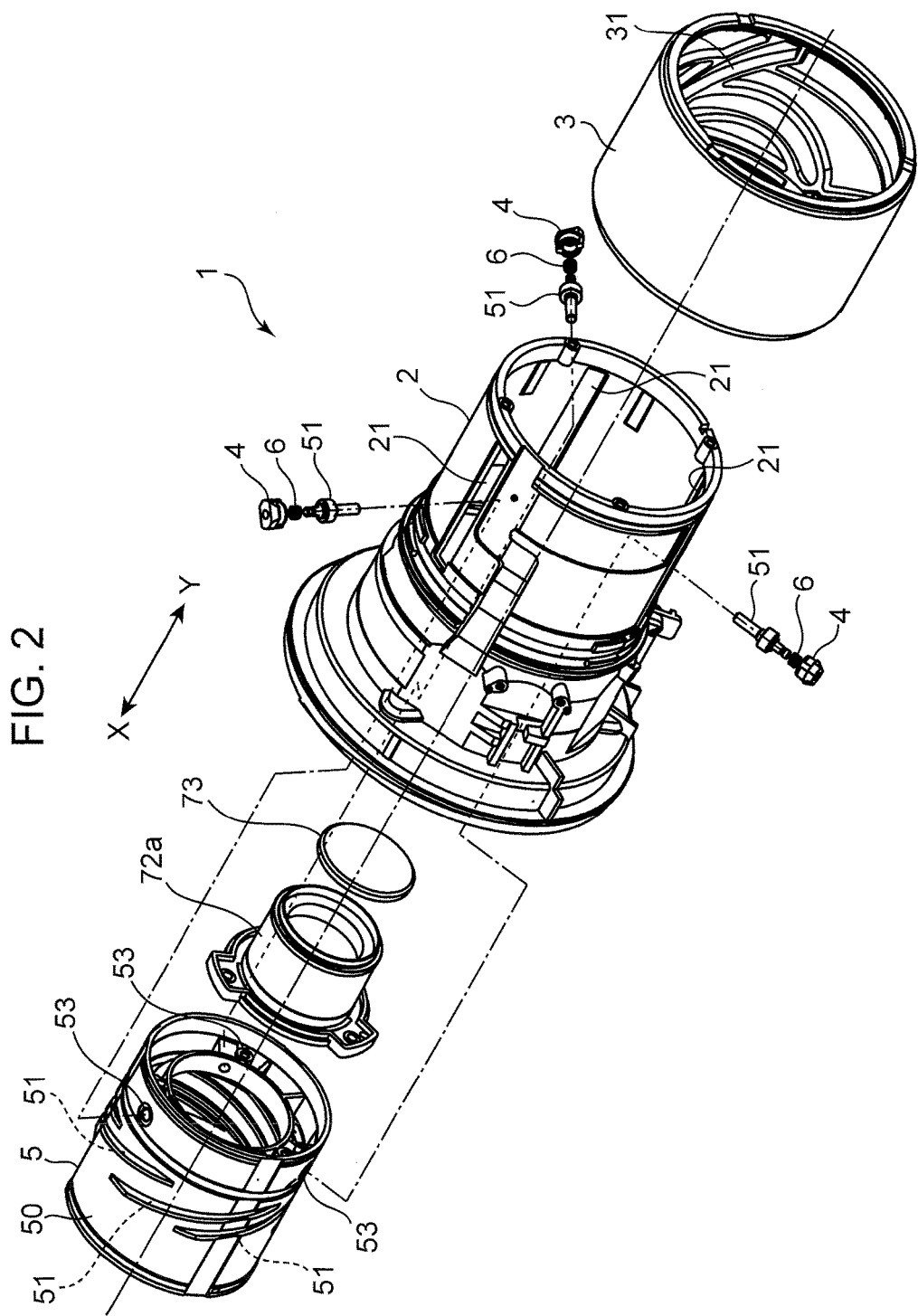
FIG. 2 is an exploded perspective view of a main portion of the lens barrel illustrated in FIG. 1.
Figure 3:
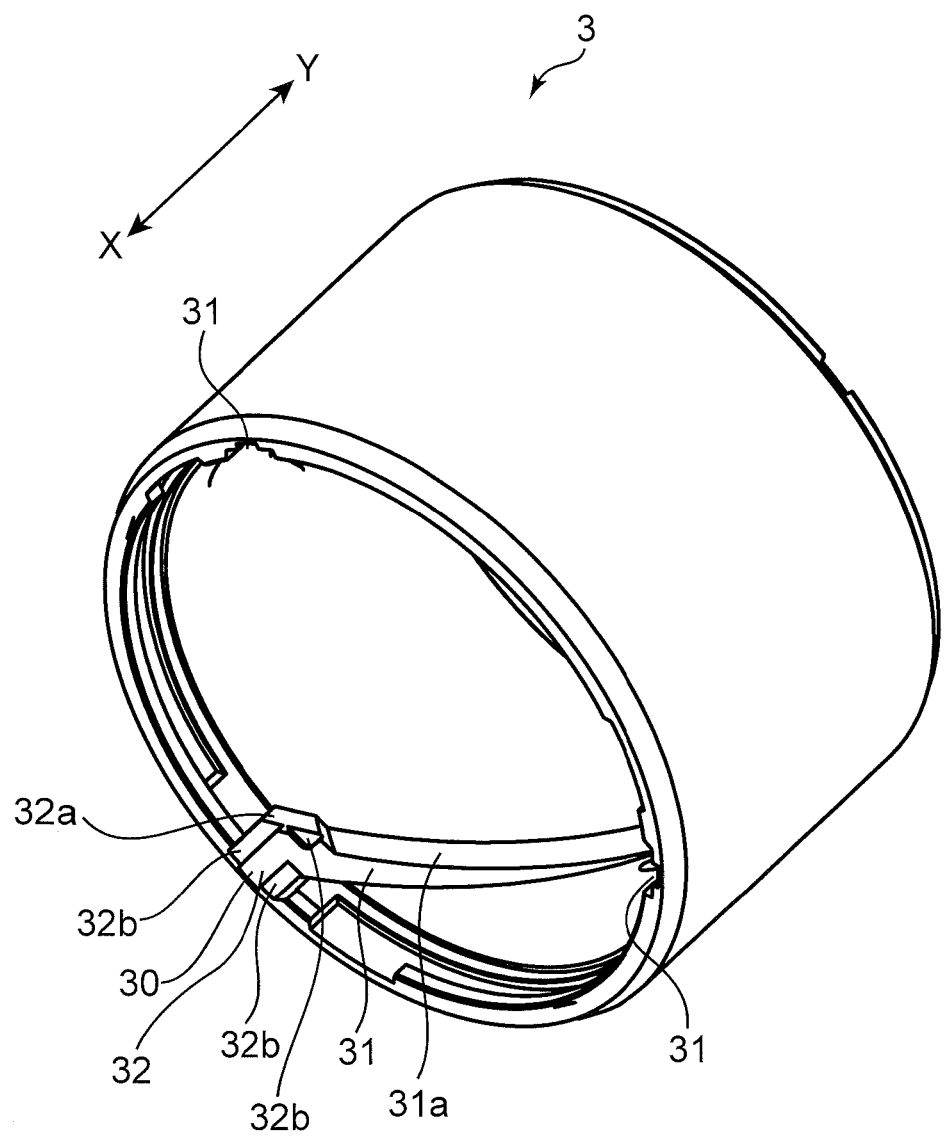
FIG. 3 is a perspective view of a cam cylinder used in the lens barrel illustrated in FIG. 1.
Figure 4:
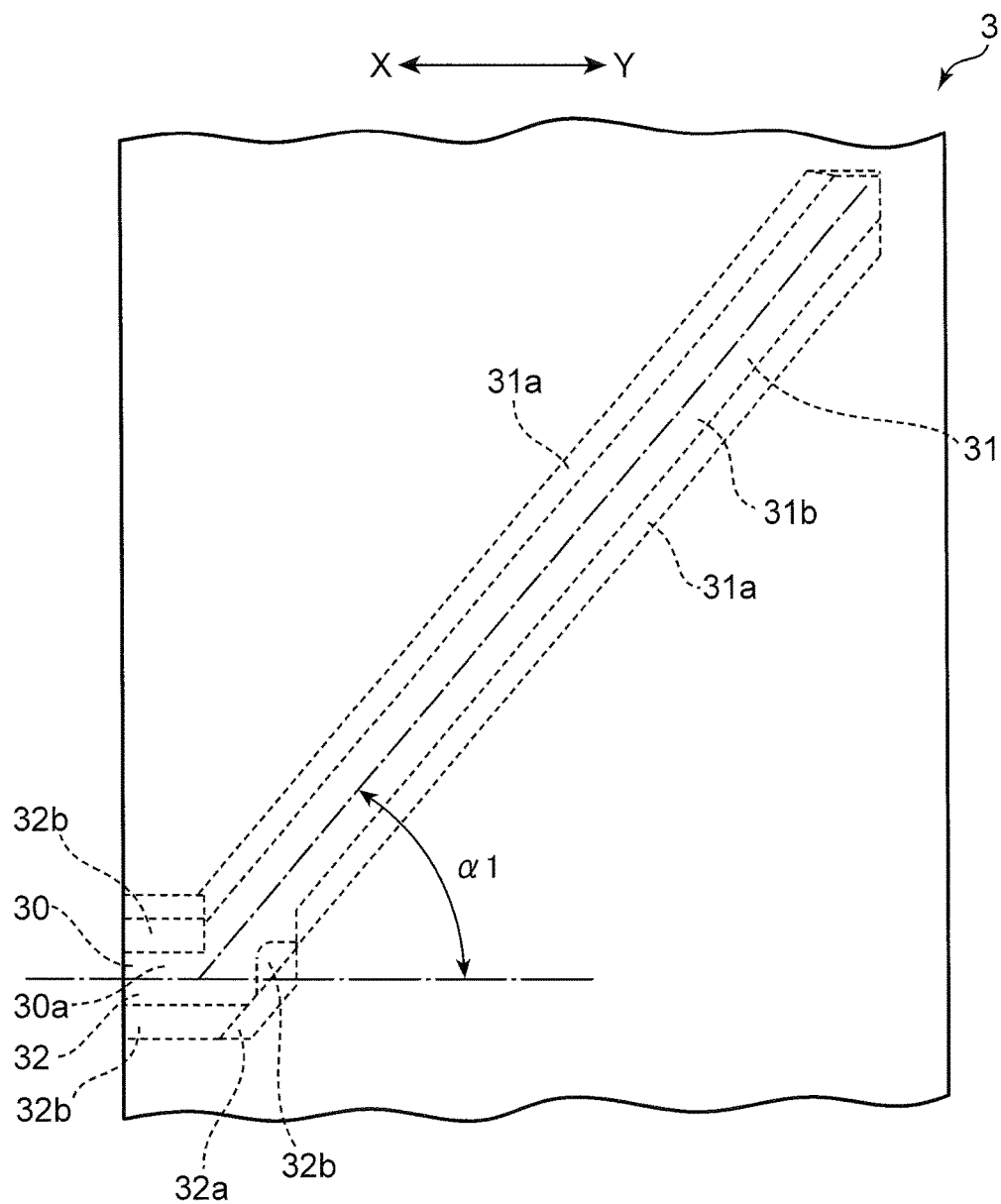
FIG. 4 is an enlarged plan view of a main portion of the cam cylinder illustrated in FIG. 3.
Figure 5A:
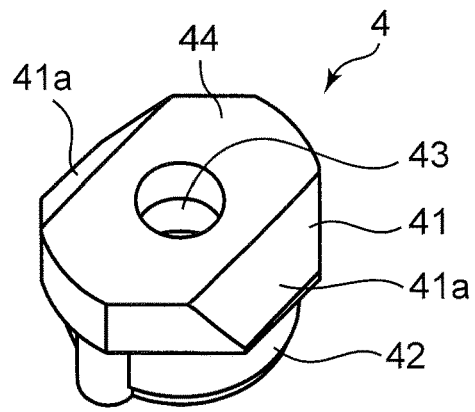
FIGS. 5A, 5B, and 5C illustrate a cam follower used in the lens barrel illustrated in FIG. 1.
Figure 5B:
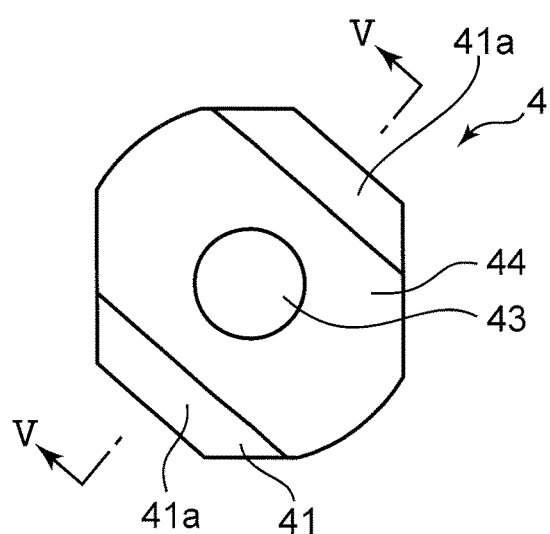
Figure 5C:
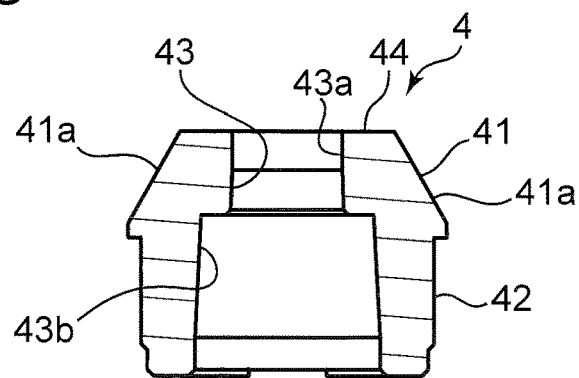
Figure 6A:
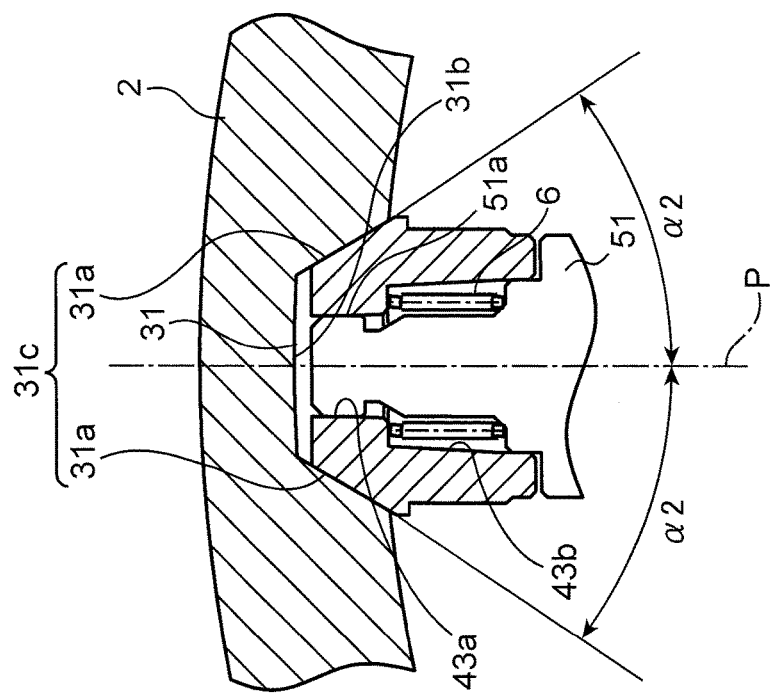
FIGS. 6A and 6B show views for describing a state in which the cam follower is in contact with a cam groove in the lens barrel illustrated in FIG. 1.
Figure 6B:
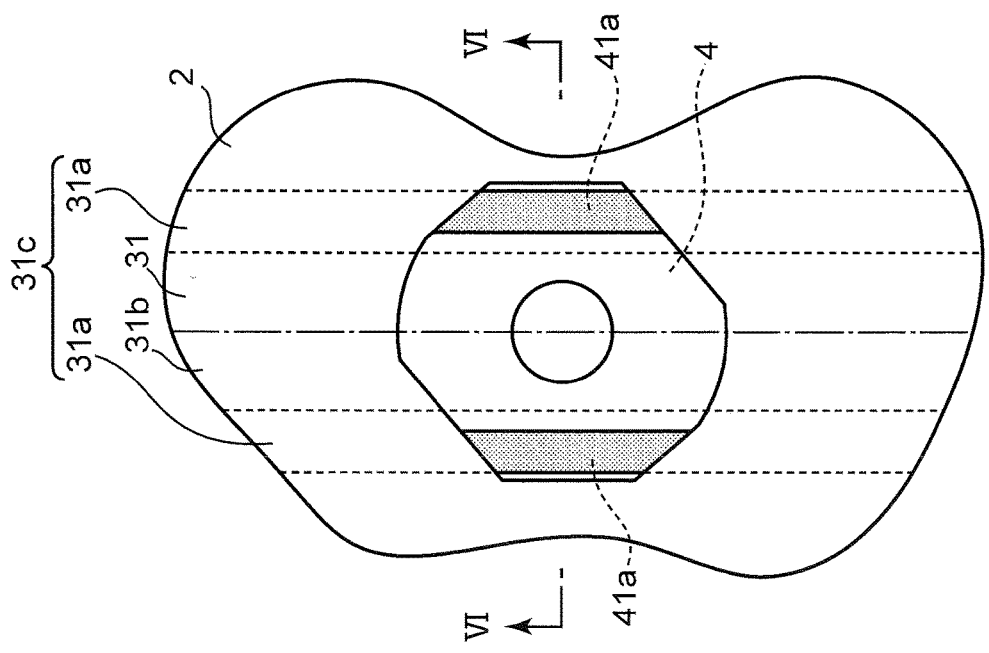
Figure 7:
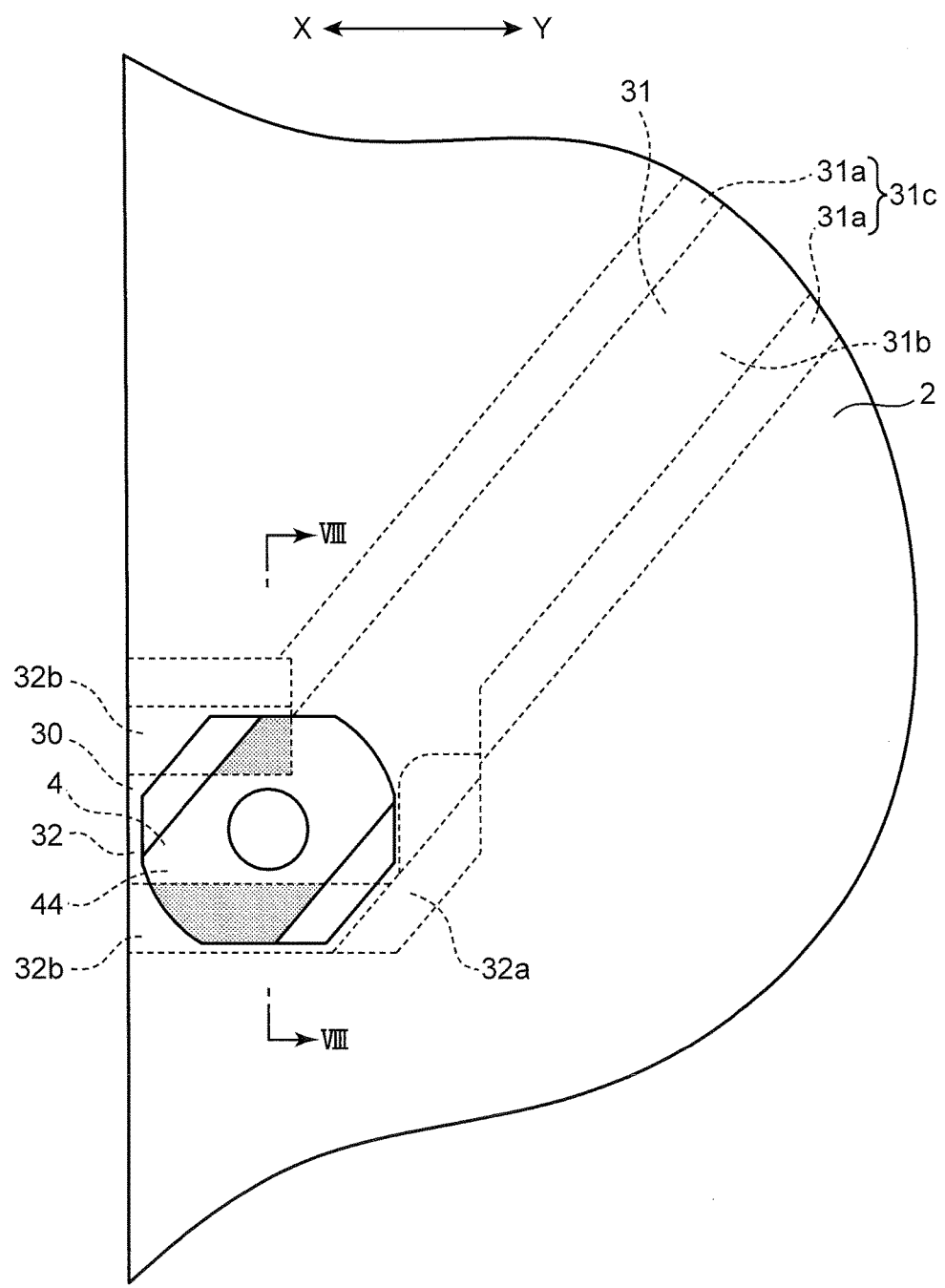
FIG. 7 is an enlarged plan view of a main portion in a state in which the cam follower has entered a cam follower introducing groove in accordance with one or more embodiments.
Figure 8:
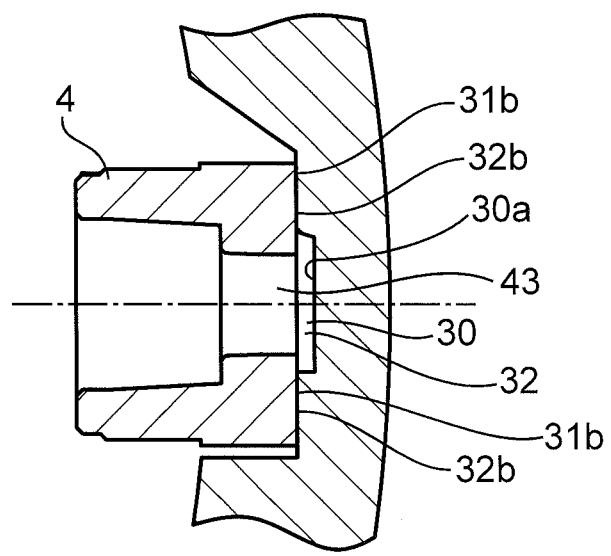
FIG. 8 is a sectional view taken along the line VIII-VIII in FIG. 7.
Figure 9B:
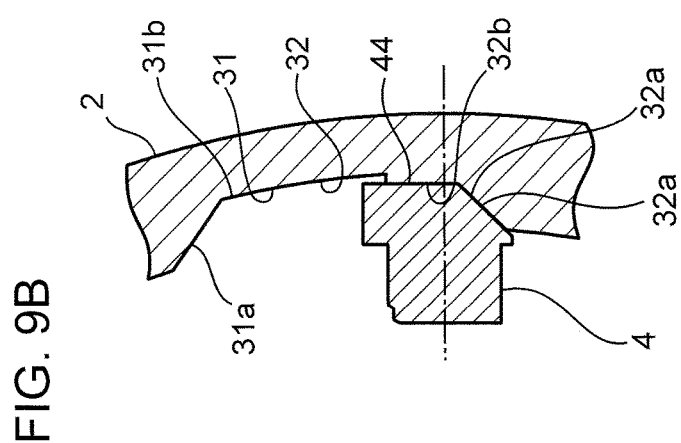
FIGS. 9A and 9B show views for describing a state in which the cam follower is in contact with an orientation matching portion of the cam follower introducing groove in the lens barrel illustrated in FIG. 1.
Figure 9A:
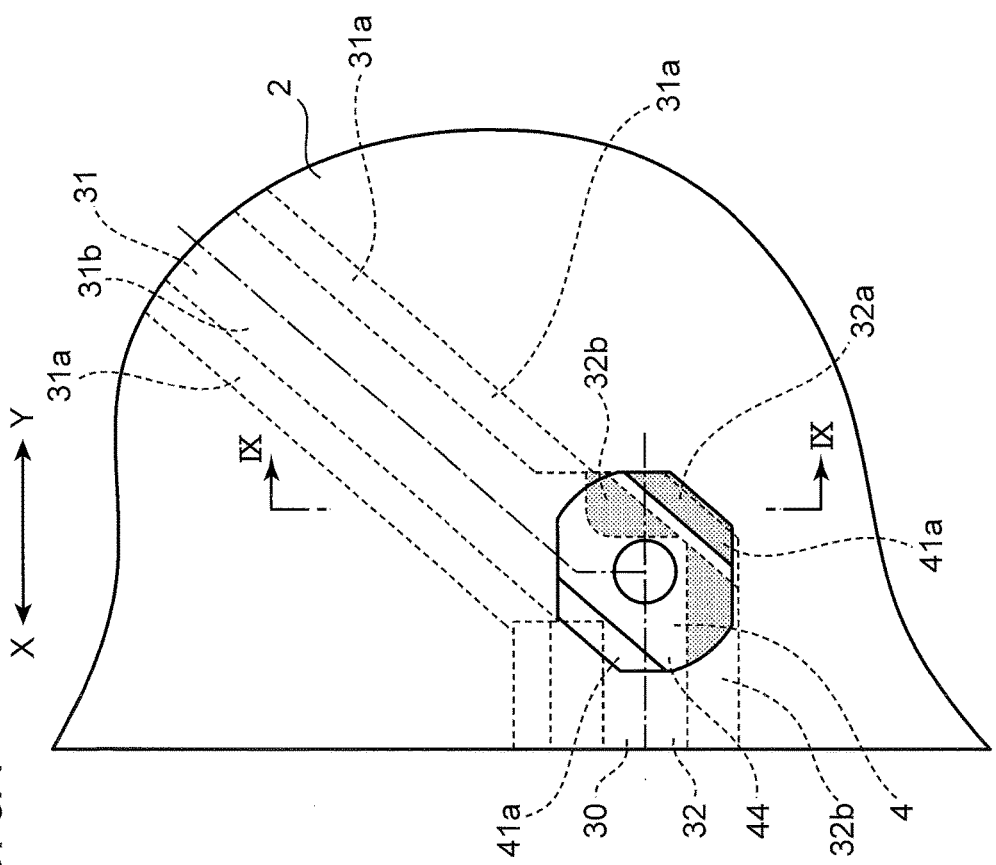

FIG. 1 is a half-sectional view of a lens barrel 1 according to a first embodiment, by way of example. FIG. 2 is an exploded perspective view of a main portion of the lens barrel 1. FIG. 3 is a perspective view of a cam cylinder used in the lens barrel 1. FIG. 4 is an enlarged plan view of a main portion of the cam cylinder illustrated in FIG. 3. FIG. 5 illustrates a cam follower used in the lens barrel 1. FIG. 5A is a perspective view of the cam follower, FIG. 5B is a plan view of the cam follower, and FIG. 5C is a sectional view taken along the line V-V in FIG. 5B. FIG. 6 shows views for describing a state in which the cam follower is in contact with a cam groove in the lens barrel 1. FIG. 6A is a plan view illustrating the state, and FIG. 6B is a sectional view taken along the line VI-VI in FIG. 6A. FIG. 7 is an enlarged plan view of a main portion where the cam follower has entered a cam follower introducing groove. FIG. 8 is a sectional view taken along the line VIII-VIII in FIG. 7. FIG. 9 shows views for describing a state in which the cam follower is in contact with an orientation matching portion of the earn follower introducing groove in the lens barrel 1. FIG. 9A is an enlarged plan view of a main portion in the state, and FIG. 9B is a sectional view taken along the line IX-IX in FIG. 9A. FIG. 10 shows views for describing a state in which the cam follower has entered the cam groove from the cam follower introducing groove. FIG. 10A is an enlarged plan view of a main portion in the state, and FIG. 10B is a sectional view taken along the line X-X in FIG. 10A. In the drawing, a direction X is a forward direction (toward an object) and a direction Y is a rearward direction (toward an image).

As illustrated in FIGS. 1 and 2, the lens barrel 1 of the first embodiment includes a fixed cylinder 2, a cam cylinder 3, cam followers 4, a moving lens holding member 5, and cam follower biasing members 6.

The fixed cylinder 2 is made of a cylinder, and has three guide hollows (guide portions) 21 having an identical configuration. The three guide hollows 21 are arranged at a regular interval along the circumference of the fixed cylinder 2.

Each of the guide hollows 21 has a predetermined width, penetrates the fixed cylinder 2 from the inner surface to the outer surface thereof, and linearly extends in an anteroposterior direction that is the axial direction (optical axis direction).

The fixed cylinder 2 of the present embodiment fixedly holds a fixed lens 71 at a front end thereof with a fixing frame interposed therebetween.

A first cover 22, a second cover 23, and a mount 24 are fixedly attached to a rear end of the fixed cylinder 2.

As illustrated in FIGS. 2 and 3, the cam cylinder 3 is made of a cylinder and has three cam grooves 31 formed in the inner surface thereof and having an identical structure. The three cam grooves 31 are arranged at a regular interval along the circumference of the cam cylinder 3.

As illustrated in FIG. 4, the cam grooves 31 have a predetermined depth from the inner surface of the cam cylinder 3, and linearly extend at a pressure angle α1 with respect to the axial direction of the cam cylinder 3 in a state where the cam cylinder 3 is developed into a plan view. Each of the cam grooves 31 includes a pair of inner side surfaces 31a disposed at a predetermined interval in the circumferential direction and a groove bed surface 31b coupling radially outside edges of the pair of inner side surfaces 31a.

As illustrated in FIG. 6B, in a cross section orthogonal to the axial direction, the pair of inner side surfaces 31a are on tilted planes that are symmetric with respect to a radial line P extending from an axial center of the cam cylinder 3 and passing through a median of the groove bed surface 31b and form an angle α2. The pair of inner side surfaces 31a forms a tapered portion 31c whose width gradually decreases as advancing radially outward.

As illustrated in FIGS. 3 and 4, the cam cylinder 3 of the present embodiment includes cam follower introducing grooves 32 for introducing cam followers 4 to the cam grooves 31. The cam follower introducing grooves 32 extend from the front end surface of the cam cylinder 3 to the cam grooves 31, respectively.

Each of the cam follower introducing grooves 32 includes a introducing groove main portion 30, an orientation matching portion 32a, and a tip receiving portion 32b.

The introducing groove main portion 30 axially extends from the front end surface of the cam cylinder 3 to the corresponding cam groove 31. The introducing groove main portion 30 has a width larger than the width of the cam groove 31, and the radial position of a introducing groove bed surface 30a of the introducing groove main portion 30 coincides with that of the groove bed surface 31b of the cam groove 31 so that the introducing groove bed surface 30a is flush with and coupled to the groove bed surface 31b.

The orientation matching portion 32a is used for matching the orientation of a tapered contact portion 41 of the cam follower 4 described later to the orientation of the tapered portion 31e of the cam groove 31 so as to ensure smooth guiding of the tapered contact portion 41 of the cam follower 4 to the tapered portion 31c of the cam groove 31, and is formed between one of inner surfaces of the introducing groove main portion 30 and one of the inner surfaces 31a of the cam groove 31.

As illustrated in FIG. 9, the orientation matching portion 32a is configured such that the angle of the orientation matching portion 32a with respect to the axial direction of the cam cylinder 3 and the angle of the orientation matching portion 32a with respect to the radial line P are equal to the corresponding angles of one of the inner surfaces 31a of the tapered portion 31c of the cam groove 31.

The tip receiving portion 32b receives the radially outside tip 44 of the cam follower 4, and matches the radial position of the tapered contact portion 41 of the cam follower 4 to the tapered portion 31c of the cam groove 31 so as to ensure smooth guiding of the tapered contact portion 41 to the tapered portion 31c of the cam groove 31.

As illustrated in FIGS. 3 and 4, the tip receiving portions 32b respectively project at three locations, i.e., laterally opposite sides and a side of the orientation matching portion 32a, radially inward in the cam cylinder 3 from the introducing groove bed surface 30a as illustrated in FIG. 8.

The projection height of the tip receiving portion 32b from the introducing groove bed surface 30a (i.e., the radial position of the tip receiving portion 32b) is equal to the radial position of the tip 44 of the cam follower 4 in a state in which the tapered contact portion 41 of the cam follower 4 is in surface contact with the tapered portion 31c of the cam groove 31.

The thus-configured cam cylinder 3 is disposed radially outside the fixed cylinder 2 in such a manner that the cam cylinder 3 can rotate about the axis of the fixed cylinder 2 and cannot move in the axial direction.

As illustrated in FIG. 2, the cam followers 4 or the three cam followers having the identical configuration are slidable on the cam grooves 31. As illustrated in FIG. 5, each of the cam followers 4 includes a cam follower main body, an axial hole 43 formed in the cam follower main body and penetrating the center of the main body from an end (tip) to the other end, a tapered contact portion 41 formed in an outer circumference on an end of the cam follower main body, and a guide hollow passing portion 42 formed in an outer circumference on the other end of the cam follower main body.

The axial hole 43 includes an axial passage hole 43a through which a can follower holding shaft 51 of the moving lens holding member 5 described later is passed and a spring housing portion 43b housing a cam follower biasing member 6.

The tapered contact portion 41 has an identical or similar shape to a region of the tapered portion 31c and having a predetermined length to ensure surface contact with the tapered portion 31c of the cam groove 31.

More specifically, the tapered contact portion 41 includes a pair of tapered surface contact portions 41a to be respectively in surface contact with the pair of the inner surfaces 31a of the tapered portion 31c.

Each of the pair of tapered surface contact portions 41a is formed along a plane at the same angle as the inner surface 31a with respect to the radial line P passing through the center of the corresponding cam groove 31 of the cam cylinder 3, and comes into surface contact with each of the pair of inner surfaces 31a of the tapered portion 31c as illustrated in FIG. 6A (where the surface contact portions are hatched). In other words, the tapered surface contact portions 41a are on inclined planes whose distance to the axial center of the cam follower 4 gradually decreases toward the tips thereof. The tapered contact portion 41 including the pair of tapered surface contact portions 41a are on the tapered planes, the distance between which gradually decreases toward the tip thereof.

The guide hollow passing portion 42 has a substantially circular shape whose diameter is approximately equal to the width of the guide hollow 21 of the fixed cylinder 2, and is movably passed through the guide hollow 21 of the fixed cylinder 2.

The cam follower biasing members 6 will now be described. The cam follower biasing members 6 are used to bias the cam followers 4 radially outward. Each of the cam follower biasing members 6 according to the present embodiment includes an elastic member, e.g., a coil spring as illustrated in FIGS. 2 and 3. A cam follower holding shaft 51 of the moving lens holding member 5 described later is passed through an axial center portion of the coil spring, and in this state, is housed in the spring housing portion 43b of the corresponding cam follower 4.

The cam follower biasing member 6 housed in the spring housing portion 43b has one end in contact with an inner end surface of the spring housing portion 43b of the cam follower 4 and another end in contact with the cam follower holding shaft 51 of the moving lens holding member 5. In this manner, the cam follower biasing member 6 biases the cam follower 4 radially outward from the cam cylinder 3, i.e., in the axial direction of the cam follower holding shaft 51.

The cam follower biasing members 6 are not limited to the configuration made of the three components that respectively bias the three cam followers, but may be composed of a single component that biases at least one of the cam followers 4.

The moving lens holding member 5 will now be described. As illustrated in FIGS. 1 and 2, the moving lens holding member 5 includes a cylindrical holding member main body 50 and the three cam follower holding shafts 51 having an identical configuration and attached to the holding member main body 50.

The holding member main body 50 holds a moving lens on an inner circumference thereof. In the present embodiment, as illustrated in FIG. 1, the holding member main body 50 holds a first moving lens 72 at the rear of the fixed lens 71 serving as a front lens, and holds a second moving lens 73 at the rear of the first moving lens 72. In other words, the lens barrel 1 according to the present embodiment includes a three-lens image taking optical system in which the fixed lens 71, the first moving lens 72, and the second moving lens are arranged in this order from the front (toward an object) to the rear (toward an image).

The outer circumference of the first moving lens 72 is held by a cylindrical first moving lens holding frame 72a. The first moving lens holding frame 72a has a helical ridge 72b on the outer circumference thereof.

The first moving lens holding frame 72a is disposed so as to be movably fitted in a helical groove 54 formed in the holding member body 50, and coupled to a driving ring 76a rotatably disposed on the outer circumference of the fixed cylinder 2. When the driving ring 76a is driven to rotate, the first moving lens holding frame 72a moves in the anteroposterior direction, that is, the optical axis direction, with respect to the holding member body 50.

More specifically, the first moving lens holding frame 72a is coupled to an end of a coupling strip 76b. The other end of the coupling strip 76b is coupled to a cooperative ring 76c rotatably disposed between the fixed cylinder 2 and the driving ring 76a such that a torque of the coupling strip 76b can be transmitted. The cooperative ring 76c is coupled to the driving ring 76a and an unillustrated motor such that a torque can be transmitted.

When the driving ring 76a rotates, the first moving lens holding frame 72a moves in the anteroposterior direction accordingly by means of the coupling strip 76b and the cooperative ring 76c.

In the holding member main body 50 of the present embodiment, a diaphragm unit 74 fixedly attached to the holding member body 50 is disposed between the first moving lens 72 and the second moving lens 73, and a coil spring 75 is disposed between the diaphragm unit 74 and the first moving lens holding frame 72a.

The coil spring 75 according to the present embodiment is a tapered coil spring whose diameter gradually decreases from the diaphragm unit 74 toward the first moving lens holding frame 72a. The rear end of the coil spring 75 is in contact with the diaphragm unit 74 and the front end of the coil spring 75 is in contact with the first moving lens holding frame 72a so that the coil spring 75 always biases the first moving lens holding frame 72a forward with respect to the diaphragm unit 74, i.e., the holding member main body 50. In this manner, the first moving lens 72 held by the first moving lens holding frame 72a can smoothly move without a tilt or chattering with respect to the holding member main body 50.

The holding member main body 50 includes a second moving lens holding portion 52 for holding the second moving lens 73 on a rear inner circumference thereof. The second moving lens 73 is fixedly held by the second moving lens holding portion 52 by the fixing frame 73a with a bolt, for example.

The holding member main body 50 includes three holding shaft attachment portions 53 having an identical configuration for attaching the cam follower holding shafts 51. The holding shaft attachment portions 53 are arranged at a regular interval along the circumference of the holding member body 50. Each of the holding shaft attachment portions 53 penetrates the holding member body 50 from the outer surface to the inner surface thereof.

As illustrated in FIG. 6B, each of the cam follower holding shafts 51 includes a cam follower holding portion 51a for holding the corresponding cam follower 4 such that the cam follower 4 can rotate and move in the axial direction, at the tip thereof, i.e., an axial end thereof.

As illustrated in FIGS. 1 and 2, each of the cam follower holding shafts 51 is passed through the corresponding holding shaft attachment portion 53 of the holding member body 50 previously formed in the inner surface of the fixed cylinder 2 to be held such that the other axial end of the cam follower holding shaft 51 is passed through the guide hollow 21 from the outer surface of the fixed cylinder 2.

In this state, the cam follower holding portion 51a has an extension radially outward from the holding member body 50 to project radially outward from the fixed cylinder 2 through the guide hollow 21 of the fixed cylinder 2.

After the cam follower biasing member 6 is then placed over the cam follower holding portion 51a in this state, the shaft is passed through the axial passage hole 43a of the cam follower 4. In this manner, the cam follower biasing member 6 is housed in the spring housing portion 43b such that the guide hollow passing portion 42 of the cam follower 4 is passed through the guide hollow 21 of the fixed cylinder 2, and the tapered contact portion 41 projects radially outward from the guide hollow 21 of the fixed cylinder 2. The cam follower holding shafts 51 are not necessarily separated from the holding member main body 50, and may be integrated with the holding member main body 50. The cam follower holding shaft 51 may be modified when necessary.

In this manner, the cam followers 4 held by the moving lens holding member 5 are guided from the cam follower introducing grooves 32 to the cam grooves 31 of the cam cylinder 3 in the following manner.

First, as illustrated in FIG. 7, each of the cam followers 4 is inserted into the introducing groove main portion 30 of the corresponding cam follower introducing groove 32 while being pushed radially inward in the cam cylinder 3 against a biasing force of the cam follower biasing member 6. At this time, since the width of the introducing groove main portion 30 is larger than the diameter of the cam follower 4, the cam follower 4 can be easily inserted. The tip 44 of the cam follower 4 inserted in the introducing groove main portion 30 is in contact with the tip receiving portion 32b of the cam follower introducing groove 32 as illustrated in FIGS. 7 and 8 (where the contact portions are hatched in FIG. 7).

Next, when the cam follower 4 is pushed against the cam follower introducing groove 32, the cam follower 4 comes into contact with the orientation matching portion 32a of the cam follower introducing groove 32 with the tip 44 of the cam follower 4 being sliding on the tip receiving portion 32b of the cam follower introducing groove 32.

Subsequently, when the cam follower 4 is further pushed into the cam follower introducing groove 32, the cam follower 4 rotates so that one of the tapered surface contact portions 41a abuts and stops on the orientation matching portion 32a of the cam follower introducing groove 32 to come into surface contact with the orientation matching portion 32a as illustrated in FIG. 9.

In this state, the orientation of the tapered contact portion 41 is matched to the orientation of the tapered portion 31c of the cam groove 31. Since the tip 44 of the cam follower 4 is in contact with the tip receiving portion 32b of the cam follower introducing groove 32 in this state, the radial positions of the tapered contact portion 41 and the tapered portion 31c of the cam groove 31 match each other.

Accordingly, the cam follower 4 smoothly moves from the state described above to the tapered portion 31c of the cam groove 31, as illustrated in FIG. 10. In this manner, the lens barrel 1 according to the present embodiment eliminates the operation of matching the orientation of the tapered contact portions 41 of the cam followers 4 to the orientation of the tapered portions 31c of the cam grooves 31, and the cam followers 4 held by the moving lens holding member 5 can be easily guided to the cam grooves 31 of the cam cylinder 3.

In the use state after the cam followers 4 have been guided to the cam grooves 31 of the cam cylinder 3, the cam followers 4 do not enter the introducing groove main portions 30 of the cam grooves 31, and the cam followers 4 do not come into contact with any of the orientation matching portions 32a and the tip receiving portions 32b.

In addition, as described above, the projection height of the tip receiving portions 32b from the introducing groove bed surfaces 30a (i.e., the radial position in the tip receiving portions 32b) is equal to the radial positions of the tips 44 in the cam followers 4 in a state in which the tapered contact portions 41 of the cam followers 4 are in surface contact with the tapered portions 31c of the cam grooves 31. However, the present invention is not limited to this configuration, and the configuration may be modified as necessary. For example, the tip receiving portions 32b from the introducing groove bed surfaces 30a may be set such a projection height that the projection tops of the tip receiving portions 32b from the introducing groove bed surfaces 30a are located radially inside the tips 44 of the cam followers 4 in a state in which the tapered contact portions 41 of the cam followers 4 are in surface contact with the tapered portions 31c of the cam grooves 31. In this case, the cam followers 4 can be also easily guided to the cam grooves 31 of the cam cylinder 3.

The mount 24 of the lens barrel 1 having the foregoing configuration is attached to an imaging device main body, thereby enabling the lens barrel 1 to be mounted to the imaging device main body to be used. The imaging device main body includes an image taking element 9 for converting an optical image taken by the image taking optical system including the lenses 71 to 73 in the lens barrel 1 into an electrical signal.

As illustrated in FIG. 1, an unillustrated operation ring rotatably disposed on the outer circumference of the first cover 22 is rotated, thereby rotating the cam cylinder 3 coupled to this operation ring so that a toque can be transmitted.

With the rotation of the cam cylinder 3, the cam followers 4 slide on the cam grooves 31. During this sliding, the guide hollow passing portions 42 of the cam followers 4 move in the anteroposterior direction, that is, the optical axis direction, along the guide hollows 21 of the fixed cylinder 2. In this manner, the moving lenses 72 and 73 held by the moving lens holding member 5 holding the cam followers 4 move in the anteroposterior direction.

In the foregoing configuration of the lens barrel 1, the tapered contact portions 41 of the cam followers 4 is allowed to be in surface contact with the tapered portions 31c of the cam grooves 31, and the cam follower biasing members 6 push the tapered contact portions 41 against the tapered portions 31c. Thus, the tapered contact portions 41 can be always held in surface contact with the tapered portions 31c.

In this manner, the contact area between the tapered contact portions 41 and the tapered portions 31c of the cam grooves 31 is larger than the conventional line contact manner. Thus, it is possible to reduce the possibility of displacement of the cam followers 4 from the cam grooves 31 or deformation of the cam followers 4 and/or the cam grooves 31 even upon application of an impact to the lens barrel 1.

Since the moving lens holding member 5 rotatably holds the cam followers 4, the tapered contact portions 41 of the cam followers 4 can be formed in conformity with the tapered portions 31c of the cam grooves 31, and the tapered contact portions 41 of the cam followers 4 can smoothly slide on the tapered portions 31c of the cam grooves 31.

In the first embodiment described above, the cam cylinder 3 includes the three cam grooves 31, the fixed cylinder 2 includes the three guide hollows 21, and the three cam followers 4 are provided corresponding to the cam grooves 31 and the guide hollows 21. However, the present invention is not limited to this configuration, and the configuration may be variously modified.

Figure 11:
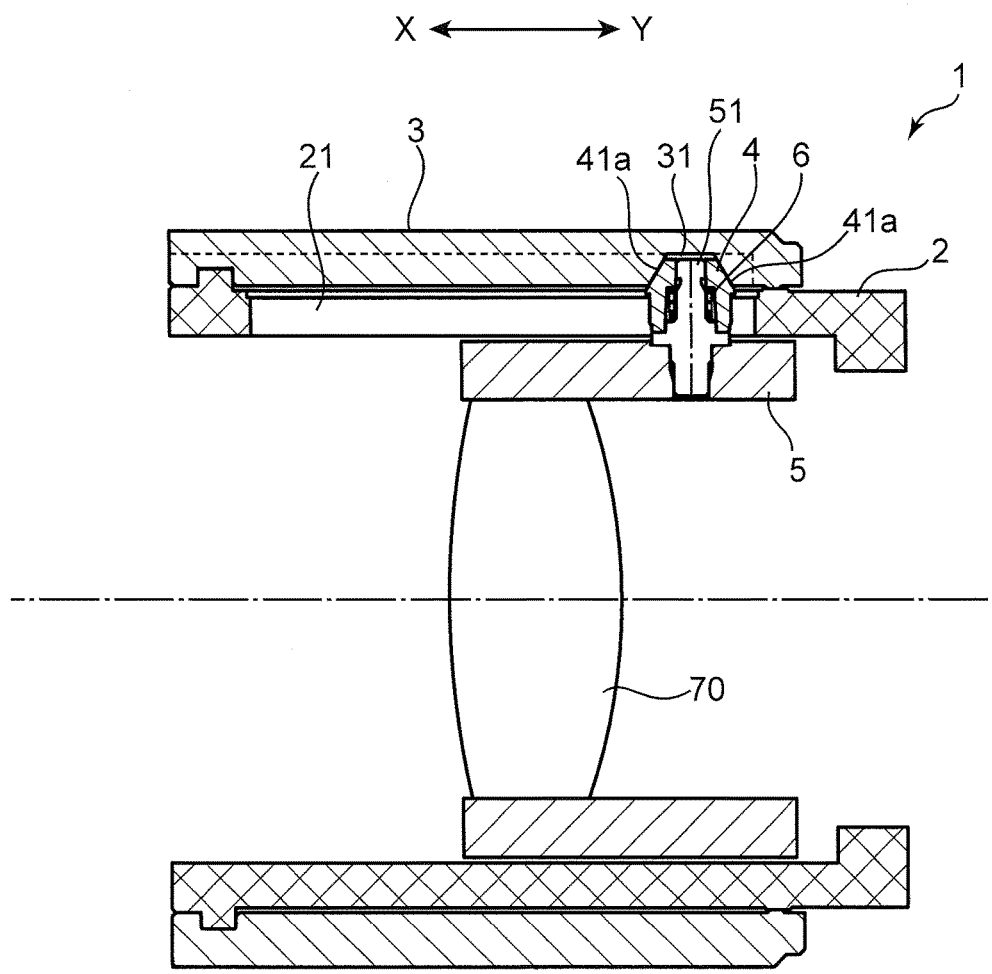
FIG. 11 is a sectional view of a main portion of a variation of the first embodiment.

FIG. 11 is a sectional view of a main portion according to a variation of the first embodiment. For example, as illustrated in FIG. 11, the outer circumference of the moving lens holding member 5 holding the moving lens 70 may be fitted in the inner circumference of the fixed cylinder 2 in such a way that the moving lens holding member 5 can move in the optical axis direction and cannot move radially, the cam cylinder 3 may include one or more cam grooves 31, the fixed cylinder 2 may include one or more guide hollows 21, and the number of the cam followers 4 may correspond to the number of the cam grooves 31 and the number of the guide hollows 21.

Figure 12:
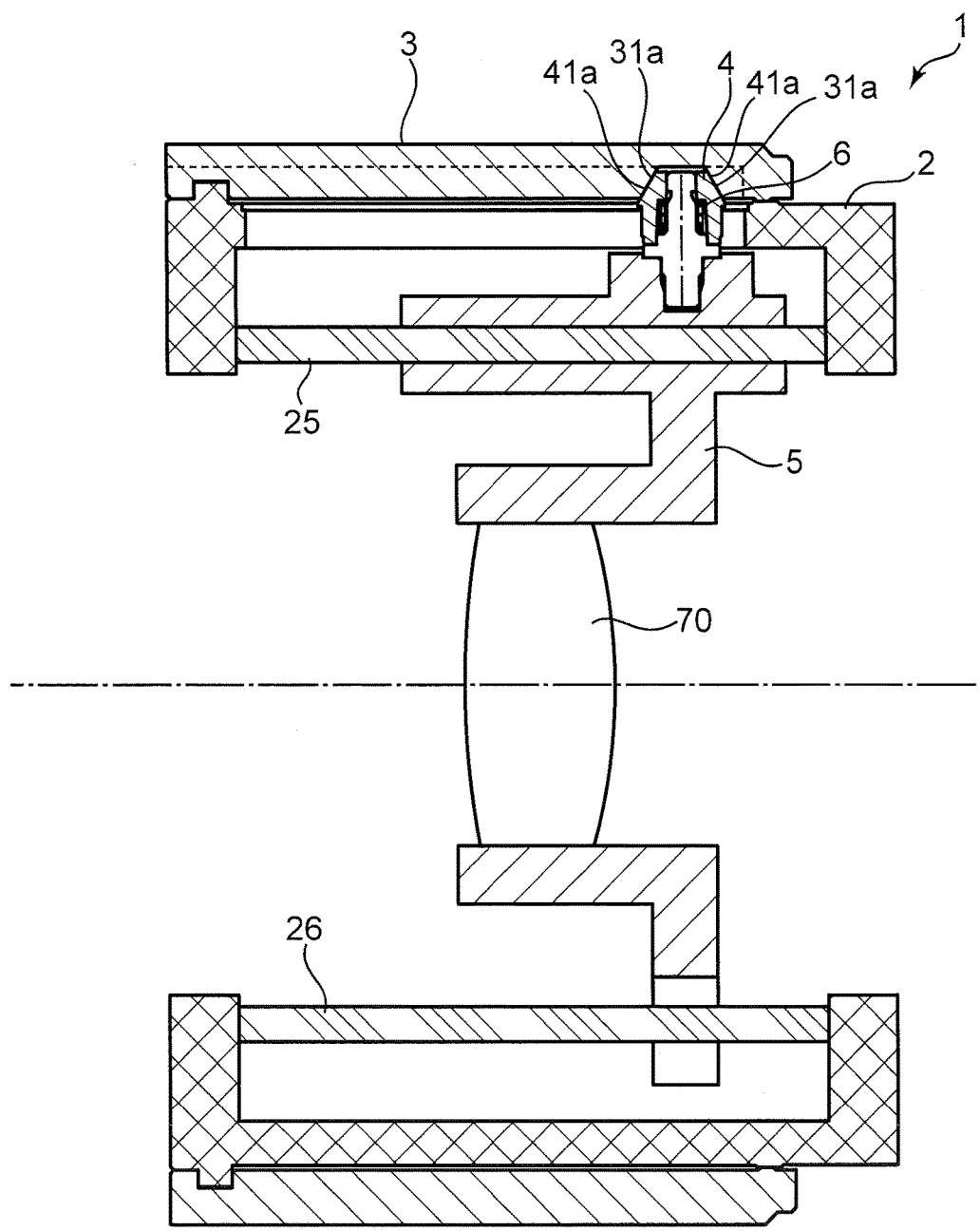
FIG. 12 is a sectional view of another variation of the first embodiment.

In the first embodiment, the fixed cylinder 2 includes the guide hollows 21. However, the present invention is not limited to this configuration, and the configuration may be variously modified. FIG. 12 is a sectional view of another variation of the first embodiment. For example, as illustrated in FIG. 12, the fixed cylinder 2 may include a guide shaft 25 that is at least one axially extending guide portion and holds the moving lens holding member 5 holding the moving lens 70 in such a way that the moving lens holding member 5 can move axially. In this case, a rotation preventing shaft 26 for preventing rotation of the moving lens holding member 5 may be provided.

Figure 13:
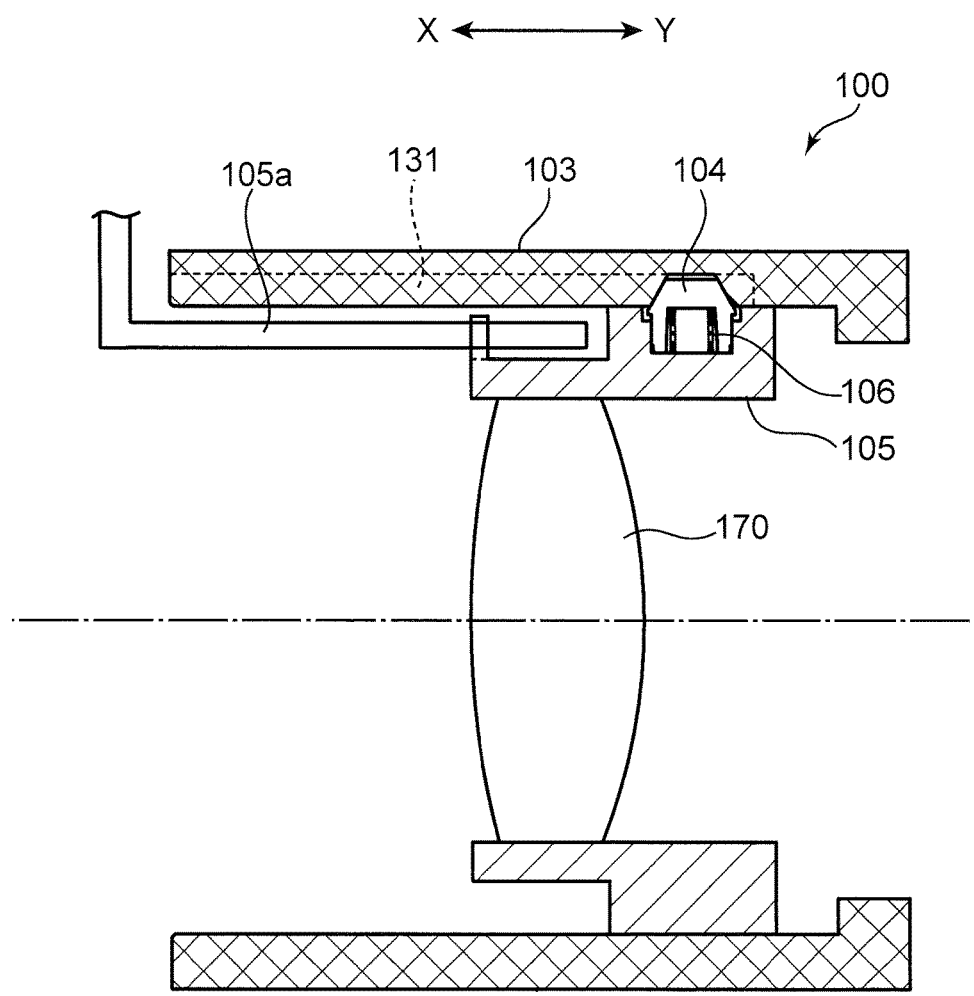
FIG. 13 is a sectional view of a lens barrel according to a second embodiment.
Figure 14:
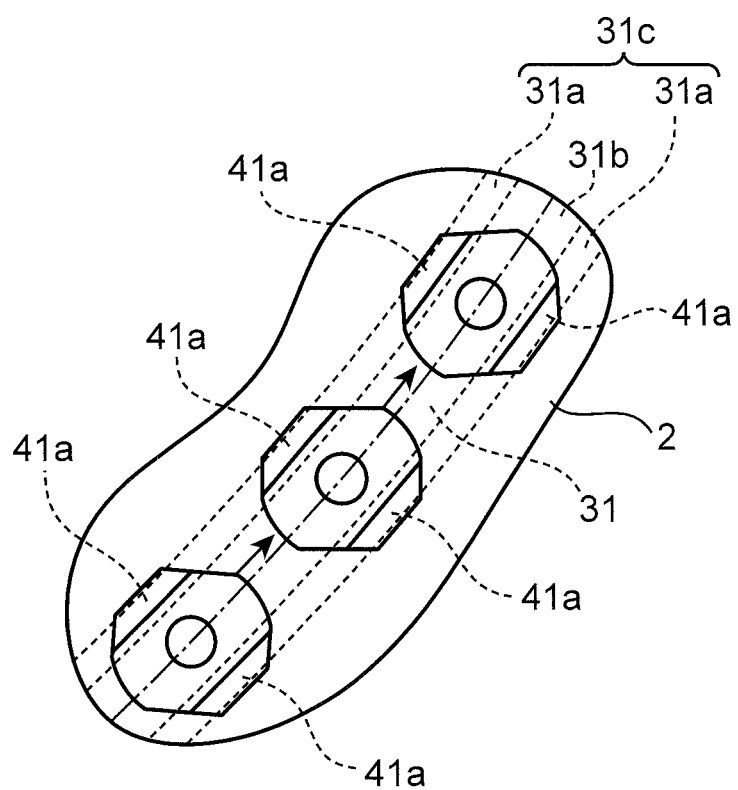
FIG. 14 is a view for describing a relationship between a cam follower and a cam groove in the lens barrel illustrated in FIG. 13.

Referring now to FIGS. 13 and 14, a lens barrel 100 according to a second embodiment will be described. FIG. 13 is a sectional view of the lens barrel according to the second embodiment. FIG. 14 is a view for describing a relationship between a cam follower and a cam groove in the lens barrel illustrated in FIG. 13. The lens barrel 100 of the second embodiment does not include a component corresponding to the fixed cylinder 2 of the first embodiment.

More specifically, with reference to FIG. 13, the lens barrel 100 according to the second embodiment includes a cam cylinder 103, cam followers 104, a moving lens holding member 105, and cam follower biasing members 106.

In a manner similar to that of the first embodiment, the cam cylinder 103 includes three cam grooves 131 (only one of which is shown in FIG. 13). The cam cylinder 103 according to the second embodiment does not rotate with respect to an image taking device main body when being mounted to the image taking device main body.

The cam followers 104 are composed of three components (only one of which is shown in the drawing) that respectively slides on the three cam grooves 131. Each of the cam followers 104 has the same configuration as the first embodiment.

In a manner similar to that of the first embodiment, the moving lens holding member 105 holds the cam followers 104 on an outer circumference thereof in such a way that the cam followers 104 can rotate and radially move, and holds a moving lens 170 on an inner circumference thereof.

The moving lens holding member 105 is disposed radially inside the cam cylinder 103 in such a way that the moving lens holding member 105 can rotate and move in an optical axis direction with respect to the cam cylinder 103.

The moving lens holding member 105 according to the present embodiment is coupled to an end of an operation coupling strip 105a. The other end of the operation coupling strip 105a is coupled to an unillustrated rotatable lens operation ring.

When the lens operation ring is rotated, the cam followers 104 move along the cam grooves 131, and accordingly, the moving lens holding member 105 and the cam followers 104 move in an anteroposterior direction, that is, an optical axis direction, while rotating around the optical axis.

In the embodiment described above, the tapered contact portion 41 has the same shape as a region of the tapered portions 31c of the cam grooves 31 with a predetermined length. The "same shape" herein includes substantially the same shape having a slight difference. More specifically, the shape of the tapered contact portions 41 may be different from the shape of the tapered portions 31c of the cam grooves 31 as long as the tapered contact portions 41 and/or the tapered portions 31c of the cam grooves 31 are elastically deformed upon application of an impact. In this range, when the tapered contact portions 41 and/or the tapered portions 31c of the cam grooves 31 are deformed upon application of an impact, the tapered contact portions 41 come into surface contact with the tapered portions 31c of the cam grooves 31 so that plastic deformation thereof can be prevented.

For example, as illustrated in FIG. 14, the tapered portion 31c of the cam groove 31 is slightly curved in the longitudinal direction so that the degree of change in the pressure angle of the cam groove 31 with respect to the axial direction of the cam cylinder 3 is small.

In the present specification, techniques in various aspects have been disclosed, and some of these techniques in accordance with one or more embodiments are summarized below.

A lens barrel according to an aspect includes: a fixed cylinder having a guide portion extending along an optical axis; a cam cylinder rotatably disposed on the fixed cylinder and including a cam groove having a tapered portion whose width gradually decreases as advancing radially outward; a cam follower including a tapered contact portion having an identical or similar shape to the tapered portion so as to come into surface contact with the tapered portion of the cam groove from a radially inside of the tapered portion and slide thereon, the cam follower moving along the guide portion when sliding on the cam groove; a moving lens holding member for holding a moving lens, and holding the cam follower rotatably and radially movably; and a cam follower biasing member configured to bias the cam follower held by the lens holding member radially outward.

In this lens barrel, the cam follower has the tapered contact portion that comes into surface contact with the tapered portion of the cam groove and slide thereon, and the cam follower biasing member pushes the tapered contact portion against the tapered portion of the cam groove. Thus, in this lens barrel, the tapered contact portion is always held in surface contact with the tapered portion of the cam groove.

Therefore, in this lens barrel, the contact area between the tapered contact portion and the tapered portion of the cam groove is larger than in the case of a conventional line contact. Thus, even when an impact is applied to the lens barrel, the possibility of displacement of the cam follower from the cam groove or deformation of the cam follower and/or the cam groove can be reduced. Accordingly, this lens barrel can eliminate conventionally used impact-resistance cam grooves, and can be thus fabricated at a smaller size and a low cost.

The lens holding member rotatably holds the cam follower. Accordingly, this lens barrel enables the tapered contact portion of the cam follower to be formed in conformity with the tapered portion of the cam groove, and enables the tapered contact portion of the cam follower to smoothly slide on the tapered portion of the cam groove, which makes it possible to permit shape errors on the cam follower, and be easily fabricated at a low cost.

According to another aspect, a lens barrel includes: a rotatable cam cylinder including a cam groove having a tapered portion whose width gradually decreases as advancing radially outward; a cam follower having a tapered contact portion having an identical or similar shape to the tapered portion so as to surface contact with the tapered portion of the cam groove from a radially inside of the tapered portion and slide thereon; a moving lens holding member for holding a moving lens, and holding the cam follower rotatably and radially movably, the moving lens holding member being rotatable with respect to the cam cylinder and movable in the optical axis direction; and a cam follower biasing member configured to bias the cam follower held by the lens holding member radially outward.

In this lens barrel, the tapered contact portion is always held in surface contact with the tapered portion of the cam groove, and the contact area between the tapered contact portion and the tapered portion of the cam groove is larger than in the case of a conventional line contact. Thus, even when an impact is applied to the lens barrel, the possibility of displacement of the cam follower from the cam groove or deformation of the cam follower and/or the cam groove can be reduced, the impact-resistance cam groove can be omitted, and the lens barrel can be easily fabricated at a low cost.

The lens holding member rotatably holds the cam follower. Therefore, this lens barrel enables the tapered contact portion of the cam follower to be formed in conformity with the tapered portion of the cam groove, and enables the tapered contact portion of the cam follower to smoothly slide on the tapered portion of the cam groove.

According to another aspect, in the tens barrels described above, the cam cylinder includes a cam follower introducing groove having a width larger than a width of the cam groove and extending from an axial one end of the cam cylinder to the cam groove, the cam follower introducing groove includes an orientation matching portion for matching an orientation of the tapered contact portion to the tapered portion of the cam groove by abutting the tapered contact portion of the cam follower, and the orientation matching portion is oriented substantially in conformity with the orientation of the tapered portion with respect to an axial direction and a radial direction of the cam cylinder.

In this lens barrel, when the tapered contact portion of the cam follower is brought into contact with the orientation matching portion of the cam follower introducing groove, the orientation of the tapered contact portion is made agreement with the orientation of the tapered portion of the cam groove. Thus, in this lens barrel, the tapered contact portion of the cam follower can be easily guided to the tapered portion of the cam groove.

According to another aspect, in the lens barrels described above, the cam cylinder includes a cam follower introducing groove having a width larger than a width of the cam groove and extending from an axial one end of the cam cylinder to the cam groove, the cam follower introducing groove includes a tip receiving portion that receives a radially outside tip of the cam follower, and the tip receiving portion is located at a substantially identical radial position to a tip of the cam follower in a state in which the tapered contact portion of the cam follower is in contact with the tapered portion of the cam groove.

Since this lens barrel includes the tip receiving portion that receives the radially outside tip of the cam follower, the radial position of the tapered contact portion of the cam follower can be made to coincide with that of the tapered portion of the cam groove when the radially outside tip of the cam follower is received by the tip receiving portion of the cam follower introducing groove. Thus, in this lens barrel, the radially outside tip of the cam follower is inserted into the tapered portion of the cam groove after the tip is received by the tip receiving portion of the cam follower introducing groove. Accordingly, the tapered contact portion of the cam follower can be easily introduced to the tapered portion of the cam groove.

According to another aspect, an imaging device includes: any one of the lens barrels described above; one or more lenses held by the lens holding member; and an image taking element that converts an optical subject image formed by the lens into an electrical signal.

Since this imaging device includes any one of the lens barrels described above, even when an impact is applied to the lens barrel, the possibility of displacement of the cam follower from the cam groove or deformation of the cam follower and/or the earn groove can be reduced, and such impact-resistance cam grooves is eliminated. Thus, the imaging device can be easily fabricated at a low cost. Since the lens holding member rotatably holds the cam follower, this image taking device enables the tapered contact portion of the cam follower to be in conformity with the tapered portion of the earn groove, and the tapered contact portion of the cam follower can smoothly slide on the tapered portion of the cam groove.

This application is based on Japanese Patent Application No. 2013-43631 filed with the Japan Patent Office on Mar. 6, 2013, the contents of which are hereby incorporated by reference.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

One or more embodiments of the present invention can provide a lens barrel and an imaging device using the lens barrel.

What is claimed is:
1. A lens barrel, comprising:
a fixed cylinder having a guide portion extending along an optical axis;

a cam cylinder rotatably disposed on the fixed cylinder and comprising a cam groove comprising a tapered portion whose width gradually decreases as advancing radially outward;
a cam follower comprising a tapered contact portion having an identical or similar shape to the tapered portion, wherein
the tapered contact portion slides along a length-wise direction of the tapered portion in surface contact with the tapered portion of the cam groove from a radially inside of the tapered portion, and
the cam follower moves along the guide portion when sliding on the cam groove;
a moving lens holding member that holds a moving lens, and that holds the cam follower rotatably and radially movably; and
a cam follower biasing member that biases the cam follower held by the lens holding member radially outward.

2. The lens barrel according to claim 1, wherein
the cam cylinder comprises a cam follower introducing groove having a width larger than a width of the cam groove and extending from an axially one end of the cam cylinder to the cam groove,
the cam follower introducing groove comprises an orientation matching portion that matches an orientation of the tapered contact portion to the tapered portion of the cam groove by abutting the tapered contact portion of the cam follower, and
the orientation matching portion is oriented substantially in conformity with the orientation of the tapered portion with respect to an axial direction and a radial direction of the cam cylinder.

3. The lens barrel according to claim 1, wherein
the cam cylinder comprises a cam follower introducing groove having a width larger than a width of the cam groove and extending from an axially one end of the cam cylinder to the cam groove,
the cam follower introducing groove comprises a tip receiving portion that receives a radially outside tip of the cam follower, and
the tip receiving portion is located at a substantially identical radial position to a tip of the cam follower in a state in which the tapered contact portion of the cam follower is in contact with the tapered portion of the cam groove.

4. An imaging device, comprising:
the lens barrel according to claim 1;
one or more lenses held by the lens holding member; and
an image taking element that converts an optical subject image formed by the lens into an electrical signal.

5. A lens barrel, comprising:
a rotatable cam cylinder comprising a cam groove comprising a tapered portion whose width gradually decreases as advancing radially outward;
a cam follower comprising a tapered contact portion having an identical or similar shape to the tapered portion, wherein the tapered contact portion slides along a length-wise direction of the tapered portion in surface contact with the tapered portion of the cam groove from a radially inside of the tapered portion;
a moving lens holding member that holds a moving lens, and that holds the cam follower rotatably and radially movably, the moving lens holding member being rotatable with respect to the cam cylinder and movable in the optical axis direction; and
a cam follower biasing member that biases the cam follower held by the lens holding member radially outward.

6. The lens barrel according to claim 5, wherein
the cam cylinder comprises a cam follower introducing groove having a width larger than a width of the cam groove and extending from an axially one end of the cam cylinder to the cam groove,
the cam follower introducing groove comprises an orientation matching portion that matches an orientation of the tapered contact portion to the tapered portion of the cam groove by abutting the tapered contact portion of the cam follower, and
the orientation matching portion is oriented substantially in conformity with the orientation of the tapered portion with respect to an axial direction and a radial direction of the cam cylinder.

7. The lens barrel according to claim 5, wherein
the cam cylinder comprises a cam follower introducing groove having a width larger than a width of the cam groove and extending from an axially one end of the cam cylinder to the cam groove,
the cam follower introducing groove comprises a tip receiving portion that receives a radially outside tip of the cam follower, and
the tip receiving portion is located at a substantially identical radial position to a tip of the cam follower in a state in which the tapered contact portion of the cam follower is in contact with the tapered portion of the cam groove.

8. An imaging device, comprising:
the lens barrel according to claim 5;
one or more lenses held by the lens holding member; and
an image taking element that converts an optical subject image formed by the lens into an electrical signal.

* * * * *